US010545703B2

(12) United States Patent
Maekawa et al.

(10) Patent No.: US 10,545,703 B2
(45) Date of Patent: Jan. 28, 2020

(54) PRINTING SYSTEM IN WHICH PRINT SETTING PROFILE IS TRANSMITTED TO PRINTING APPARATUS, PORTABLE TERMINAL DEVICE, AND PRINT CONTROL PROGRAM

(71) Applicant: Konica Minolta, Inc., Chiyoda-ku, Tokyo (JP)

(72) Inventors: Takeshi Maekawa, Osaka (JP); Katsuhiko Akita, Amagasaki (JP); Kenro Hama, Amagasaki (JP); Toshikazu Kawaguchi, Kobe (JP); Kazusei Takahashi, Nishinomiya (JP); Daisuke Sakiyama, Kawanishi (JP); Yuki Asai, Itami (JP); Yuji Tanaka, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/817,407

(22) Filed: Aug. 4, 2015

(65) Prior Publication Data
US 2016/0041798 A1 Feb. 11, 2016

(30) Foreign Application Priority Data
Aug. 6, 2014 (JP) .................. 2014-160880

(51) Int. Cl.
*G06F 3/12* (2006.01)
(52) U.S. Cl.
CPC .......... *G06F 3/1222* (2013.01); *G06F 3/1238* (2013.01); *G06F 3/1257* (2013.01);
(Continued)

(58) Field of Classification Search
CPC .... G06F 3/1222; G06F 3/1238; G06F 3/1257; G06F 3/1287; G06F 3/1288;
(Continued)

(56) References Cited

U.S. PATENT DOCUMENTS 7,298,513 B2 * 11/2007 Namikata ............ H04N 1/6033
358/1.15
8,189,225 B1 * 5/2012 Lo .......................... G06F 3/1287
358/1.15
(Continued)

FOREIGN PATENT DOCUMENTS

JP 2004-341846 A 12/2004
JP 2007-049268 A 2/2007
(Continued)

OTHER PUBLICATIONS

English Machine Translation of JP 2005-020112-A (Kasuga, Published Jan. 20, 2005).*

*Primary Examiner* — Benny Q Tieu
*Assistant Examiner* — Juan M Guillermety
(74) *Attorney, Agent, or Firm* — Buchanan Ingersoll & Rooney PC

(57) ABSTRACT

A printing system includes: a printing apparatus; a portable terminal device; and a server, which are connectable to each other, the printing apparatus including a profile creation unit, and a transmission unit, the portable terminal device including a display unit, a transfer request unit, a transfer unit, and a print instruction unit, the server including a saving unit, a reception unit, and a transmission unit, the printing apparatus further including a reception unit, and a print performing unit.

15 Claims, 12 Drawing Sheets

(52) U.S. Cl.
CPC .......... *G06F 3/1287* (2013.01); *G06F 3/1288* (2013.01); *G06F 3/1292* (2013.01)

(58) Field of Classification Search
CPC .... G06F 3/1292; G06F 3/1205; G06F 3/1207; G06F 3/1253; G06F 3/127; G06F 3/1271; G06F 3/1289; G06F 3/1286
USPC .................................................. 358/1.13, 1.15
See application file for complete search history.

(56) References Cited

U.S. PATENT DOCUMENTS

| | | | | |
|---|---|---|---|---|
| 8,625,118 B2* | 1/2014 | Tani | ................... | H04N 1/00411 358/1.15 |
| 9,276,895 B2* | 3/2016 | Pizot | ..................... | G06F 3/1292 |
| 2007/0044040 A1 | 2/2007 | Takahashi et al. | | |
| 2008/0212113 A1* | 9/2008 | Kim | ..................... | G06F 3/1284 358/1.15 |
| 2009/0279138 A1* | 11/2009 | Oba | ................... | G06F 17/30017 358/1.15 |
| 2010/0157332 A1* | 6/2010 | Hamada | ................. | H04N 1/603 358/1.16 |
| 2010/0171973 A1* | 7/2010 | Kimura | ................. | G06F 3/1287 358/1.15 |
| 2010/0277753 A1* | 11/2010 | Shinchi | ................... | H04N 1/603 358/1.9 |
| 2011/0141517 A1* | 6/2011 | Yokoyama | .............. | G06F 3/126 358/1.15 |
| 2012/0140285 A1* | 6/2012 | Kamath | ................ | G06F 3/1288 358/1.15 |
| 2012/0194850 A1* | 8/2012 | K. | .......................... | G06F 3/1288 358/1.15 |
| 2012/0300242 A1* | 11/2012 | Meike | ................... | G06F 3/1238 358/1.13 |
| 2014/0085663 A1* | 3/2014 | Kavanappillil | ........ | G06F 3/1287 358/1.15 |
| 2015/0036191 A1* | 2/2015 | Suzuki | ................. | G06F 3/1287 358/1.15 |
| 2015/0363140 A1* | 12/2015 | Koutrika | ............... | G06F 3/1288 358/1.15 |

FOREIGN PATENT DOCUMENTS

| | | | | |
|---|---|---|---|---|
| JP | 2008-083984 A | | 4/2008 | |
| JP | WO 2013168431 A1 | * | 11/2013 | ........... G06F 3/1288 |

* cited by examiner

FIG. 12

| MFP ID | IP ADDRESS | ENCRYPTION KEY | COMMUNICATION METHOD |
|---|---|---|---|
| MFP-0001 | .*.**.100 | AABB+yymmdd | NFC |
| MFP-0002 | .*.**.150 | CCDD+yymmdd | WEB LOGIN |
| MFP-0003 | .*.**.200 | EEFF+yymmdd | NFC |

FIG. 14

| BROWSER ID | BROWSER | URL | STORAGE POSITION OF PRINT SETTING PROFILE |
|---|---|---|---|
| MFP-0001 | Chrome | www.aaa.com | MY BOX |
| MFP-0002 | Chrome | www.bbb.jp | JOB |
| MFP-0003 | IE | www.ccc.com | JOB |

PRINTING SYSTEM IN WHICH PRINT SETTING PROFILE IS TRANSMITTED TO PRINTING APPARATUS, PORTABLE TERMINAL DEVICE, AND PRINT CONTROL PROGRAM

The entire disclosure of Japanese Patent Application No. 2014-160880 filed on Aug. 6, 2014 including description, claims, drawings, and abstract are incorporated herein by reference in its entirety.

BACKGROUND OF THE INVENTION

Field of the Invention

The present invention relates to a printing system including a printing apparatus, a portable terminal device, and a server connectable to each other, a portable terminal device, and a print control program.

Description of the Related Art

A technology is publicly known which is configured so that a portable terminal device including a smartphone, a tablet terminal, or the like is mounted with a browser accessible to a cloud server accesses a server through the browser, and sets to select, as a data set to be printed, a file stored in the server. Whereas, a technology is also publicly known which is configured so that a portable terminal device is mounted with an application or a browser for operating a printing apparatus, accesses a printing apparatus, and set print settings to the printing apparatus from the portable terminal device.

However, although such setting to select a data set to be printed from a server and such print setting set to a printing apparatus are configured from the same portable terminal device, the set contents themselves are stored in the server or the printing apparatus, and conventionally, a browser for selecting data from the server, and an application or a browser for setting print settings to a printing apparatus are not associated with each other. Therefore, the print settings set to the printing apparatus cannot print data selected from a cloud server.

Conventionally, as a printing system for causing a printing apparatus to print a data set to be printed on a cloud server, a printing system is proposed in JP 2008-083984 A. In the printing system, a portable terminal device obtains print setting items from a printing apparatus to cause a user to set print settings on the portable terminal device, further obtains and displays information about the data sets to be printed stored in a server to cause the user to select any from the data sets to be printed, and makes a print request to the printing apparatus adding information of the print settings and the data selection performed by the user on the portable terminal device, and the printing apparatus obtains the data set to be printed from the server based on information from the portable terminal device, and prints the obtained data set according to the print settings set on the portable terminal device.

Further, printing methods, as follows, are also known. A printing method in which printing apparatuses connectable to a cloud server are identified, and a printing apparatus from which the user desires to output an object to be printed is selected, and a printing method in which a printing apparatus obtains authentication information, such as a login ID or password, from a portable terminal device logging in to a cloud server, and the user logs in to the server from a printing apparatus, using the authentication information to obtain data to be printed.

However, in the technology described in JP 2008-083984 A, the data set to be printed is transferred from the server, and the print settings are set from the portable terminal device, so that the printing apparatus needs to wait for transfer of the data set to be printed after the print settings are set, and print settings of a next job cannot be set during waiting.

Further, in the printing method in which printing apparatuses connectable to a cloud server are identified, and a printing apparatus from which the user desires to output an object to be printed is selected, print settings of only the server can be set, and disadvantageously, print settings of the printing apparatus cannot be set.

Further, in the printing method in which a printing apparatus obtains authentication information from a portable terminal device logging in to a cloud server, and the user logs in to the server from a printing apparatus, using the authentication information to obtain data to be printed, the authentication information stored in the portable terminal device is reported to the printing apparatus, therefore, this method has a security problem.

SUMMARY OF THE INVENTION

The present invention has been made to solve such problems, and an object of the present invention is to provide a printing system, a portable terminal device, and a print control program with which a printing apparatus does not need to wait for a next job until a file to be printed is transmitted from a cloud server, print settings of the printing apparatus can be used, and authentication information stored in the portable terminal device does not need to be reported to the printing apparatus.

The above problem is solved by the followings:

(1) To achieve the abovementioned object, according to an aspect, a printing system reflecting one aspect of the present invention comprises a printing apparatus, a portable terminal device, and a server which are connectable to each other, the printing apparatus including a profile creation unit configured to create a print setting profile, and a transmission unit configured to transmit the print setting profile created by the profile creation unit, and address information of the printing apparatus itself to the portable terminal device according to a request from the portable terminal device, the portable terminal device including a display unit, a transfer request unit configured to make a request, to the printing apparatus, for transfer of the created print setting profile and the address information of the printing apparatus to the portable terminal device itself, a transfer unit configured to transfer, to the server, the print setting profile and the address information created at and transferred from the printing apparatus, based on the request from the transfer request unit, and a print instruction unit configured to select a data set to be printed from one or more data sets to be printed stored in the server based on user's operation, and make a print instruction, to the server, for printing the selected data set to be printed using the print settings according to the print setting profile, the server including a storage unit configured to store the one or more data sets to be printed, a reception unit configured to receive the print setting profile and the address information transferred from the portable terminal device, and a transmission unit configured to transmit a print job including the selected data set to be printed, and the print setting profile received from the reception unit, to the printing apparatus indicated by the address information received by the reception unit, based on the print instruction from the portable terminal device, the printing apparatus further including a reception unit configured to receive the print job transmitted from the server, and a print performing unit configured to print the data set to be printed included in the received print job using the print settings indicated in the print setting profile included in the print job.

(2) The printing system according to Item. 1, in which the portable terminal device preferably further includes a print setting unit configured to set print settings from a print setting screen on the printing apparatus, based on user's operation on the display unit, and the transfer request unit preferably makes a request, to the printing apparatus, for creating the print setting profile of the print settings set by the print setting unit.

(3) The printing system according to Item. 2, in which the portable terminal device preferably includes a first application configured to achieve a function of the print setting unit, a second application configured to achieve a function of the print instruction unit, and a third application configured to achieve functions of the transfer request unit and the transfer unit, and an icon representing the first application displayed on the display unit is preferably superposed on an icon representing the second application by the user to perform predetermined operation of starting the third application, and the third application is started.

(4) The printing system according to Item. 2, in which the portable terminal device preferably includes a first application configured to achieve a function of the print setting unit, a second application configured to achieve a function of the print instruction unit, and a third application configured to achieve functions of the transfer request unit and a transfer unit, in which the third application preferably functions to determine whether the first application has been started, detect connectable printing apparatuses when the first application has not been started, and make a request for transfer of the print setting profile to a printing apparatus selected from the detected printing apparatuses by the user.

(5) The printing system according to Item. 2, in which the portable terminal device preferably includes a first application configured to achieve a function of the print setting unit, a second application configured to achieve a function of the print instruction unit, and a third application configured to achieve functions of the transfer request unit and a transfer unit, and the third application preferably functions to determine whether the portable terminal device itself accesses an access destination preliminarily registered based on the first application and/or the second application, and register the access destination based on user's operation, when the portable terminal device accesses another access destination other than the access destination preliminarily registered.

(6) The printing system according to any one of Items. 1 to 5, in which an encryption key is preferably added to the print setting profile transferred from the printing apparatus to the portable terminal device, and further to the server, and the printing apparatus preferably confirms that the print setting profile is the print setting profile created by itself based on the encryption key added to the print setting profile transmitted from the server.

(7) The printing system according to any one of Items. 1 to 6, in which the transfer unit of the portable terminal device preferably adds attribute information to the print setting profile and transfers the print setting profile to the server, and the print instruction unit adds attribute information the same as the above attribute information to selection information indicating a selected data set to be printed, and transmits the selection information to the server.

(8) The printing system according to any one of Items. 1 to 7, in which the printing apparatus preferably includes a reporting unit configured to report a printable state of the printing apparatus to the portable terminal device, when the printable state is reported from the printing apparatus, the portable terminal device preferably displays an icon indicating the printable state of the printing apparatus on the display unit, and when the user operates the icon, the portable terminal device preferably instructs the server to transfer the print job to the printing apparatus.

(9) To achieve the abovementioned object, according to an aspect, a portable terminal device connectable to a printing apparatus and a server, reflecting one aspect of the present invention comprises a display unit, a transfer request unit configured to make a request, to the printing apparatus, for transfer of a print setting profile created at the printing apparatus and address information of the printing apparatus to the portable terminal device itself, a transfer unit configured to transfer, to the server, the print setting profile and the address information created by and transferred from the printing apparatus, based on a request from the transfer request unit, and a print instruction unit configured to select a data set to be printed from one or more data sets to be printed stored in the server, based on user's operation, and make a print instruction, to the server, for printing the selected data set to be printed using print settings according to the print setting profile.

(10) The portable terminal device according to Item. 9, in which it preferably further includes a print setting unit configured to set print settings from a print setting screen on the printing apparatus, based on user's operation on the display unit, in which the transfer request unit preferably makes a request, to the printing apparatus, for creating the print setting profile of the print settings set by the print setting unit.

(11) The portable terminal device according to Item. 10, in which it preferably further includes a first application configured to achieve a function of the print setting unit, a second application configured to achieve a function of the print instruction unit, and a third application configured to achieve functions of the transfer request unit and the transfer unit, in which an icon representing the first application is preferably superposed on an icon representing the second application by the user, which are displayed on the display unit, to perform predetermined operation of starting the third application, and the third application is started.

(12) The portable terminal device according to Item. 10, in which it preferably further includes a first application configured to achieve a function of the print setting unit, a second application configured to achieve a function of the print instruction unit, and a third application configured to achieve functions of the transfer request unit and a transfer unit, in which the third application preferably functions to determine whether the first application has been started, detect connectable printing apparatuses and make a request for transfer of the print setting profile to a printing apparatus selected from the detected printing apparatuses by the user.

(13) The portable terminal device according to Item. 10, in which it preferably further includes a first application configured to achieve a function of the print setting unit, a second application configured to achieve a function of the print instruction unit, and a third application configured to achieve functions of the transfer request unit and a transfer unit, in which the third application preferably functions to determine whether the portable terminal device itself accesses an access destination preliminarily registered, based on the first application and/or the second application, and register the access destination based on user's operation, when the portable terminal device itself accesses the access destination preliminarily registered.

(14) The portable terminal device according to any one of Items. 9 to 13, in which the transfer unit preferably adds attribute information to the print setting profile and transfers the print setting profile to the server, and the print instruction unit preferably adds attribute information the same as the above attribute information to selection information indicating a selected data set to be printed, and transmits the selection information to the server.

(15) The portable terminal device according to any one of Items. 9 to 14, in which the portable terminal device preferably displays an icon indicating the printable state reported from the printing apparatus, on the display unit, and when the user operates the icon, the portable terminal device preferably instructs the server to transfer the print job to the printing apparatus.

(16) To achieve the abovementioned object, according to an aspect, a non-transitory recording medium storing a computer readable print control program reflecting one aspect of the present invention causes a computer of a portable terminal device connectable to a printing apparatus and a server, to perform a transfer request step of making a request, to the printing apparatus, for transfer of a print setting profile created at the printing apparatus and address information of the printing apparatus to the portable terminal device itself, a transfer step of transferring, to the server, the print setting profile and the address information created at and transferred from the printing apparatus, based on the request from the transfer request step, and a print instruction step of selecting a data set to be printed from one or more data sets to be printed stored in the server, based on user's operation, and making a print instruction, to the server, for printing the selected data set to be printed using print settings according to the print setting profile.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 12 is a table illustrating exemplary information about printing apparatuses registered in a portable terminal device;

FIG. 14 is a table illustrating an example of registered information about browsers for access to a remote application and/or a server.

DESCRIPTION OF THE PREFERRED EMBODIMENTS

Hereinafter, an embodiment of the present invention will be described with reference to the drawings. However, the scope of the invention is not limited to the illustrated examples.

Figure 1:
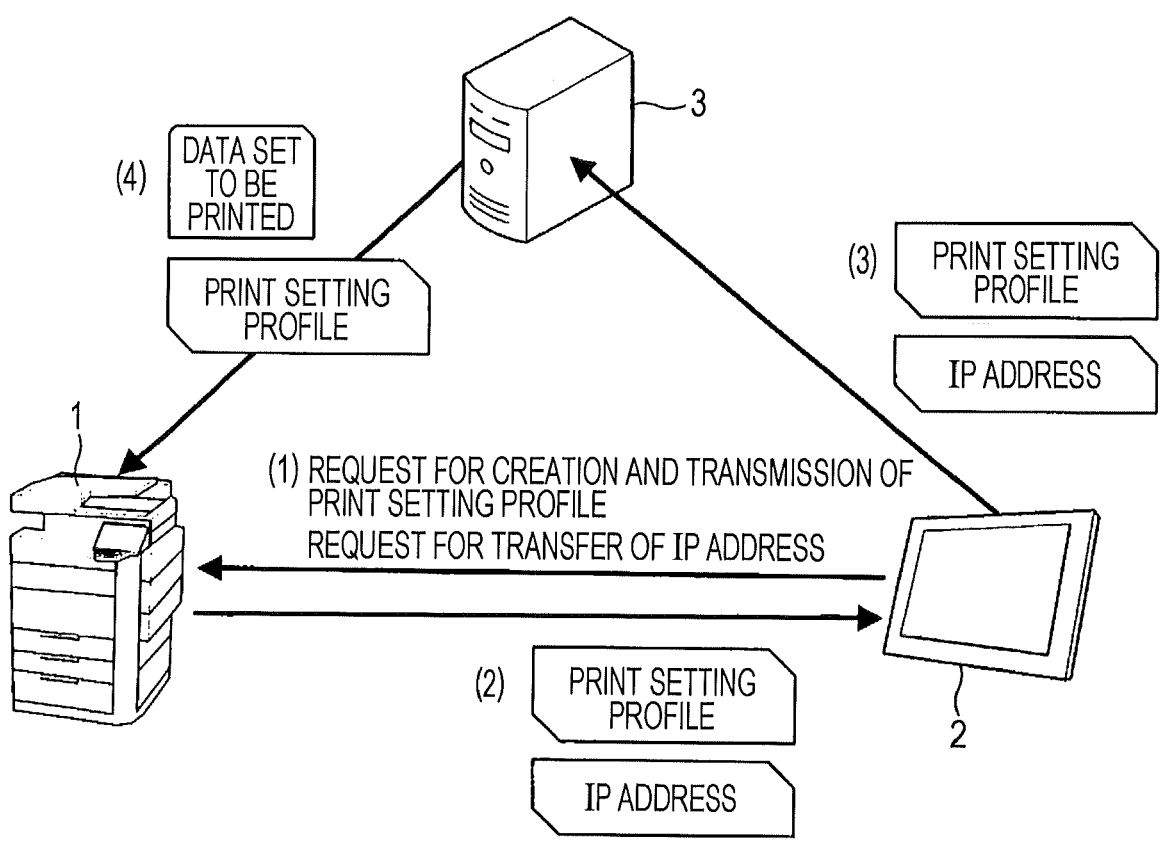
FIG. 1 is an overall diagram of a printing system according to an embodiment of the present invention.

FIG. 1 is an overall diagram of a printing system according to an embodiment of the present invention. This printing system includes a printing apparatus 1, a portable terminal device 2 including a smartphone, a tablet terminal, or the like, a cloud server 3, and the like. The printing apparatus 1, the portable terminal device 2, and the server 3 are configured to be connected to each other through a wireless LAN router or a network.

In the present embodiment, as the printing apparatus 1, a multi function peripheral (MFP) being a multifunctional digital image forming apparatus is used which includes a copy function, a print function, a scan function, a facsimile function, and the like. Hereinafter, the printing apparatus is also referred to as MFP. Further, the portable terminal device is also referred to as portable terminal.

In the printing system of FIG. 1, a user of the portable terminal 2 sets print settings on a print setting screen of the MFP 1 displayed on the portable terminal 2. At this time, when the portable terminal 2 makes a request for creation of a print setting profile about print settings of the portable terminal, a request for transfer of the print setting profile to the portable terminal 2, and a request for transfer of an IP address of the MFP 1, to the MFP 1 (circled number 1 in FIG. 1) the MFP 1 creates the print setting profile, and transmits the created print setting profile, and the IP address or the like of itself to the portable terminal 2 (circled number 2).

The portable terminal 2 transfers, to the server 3 (circled number 2), the transferred print setting profile and IP address or the like of itself. Whereas, the user of the portable terminal 2 logs in from the portable terminal 2 to the server 3, and selects a data set to be printed from data sets stored in the server 3. The server 3 transmits the selected data set to be printed accompanied by the print setting profile or the like to the MFP 1 (circled number 4). The MFP 1 prints the data set to be printed received from the server 3 according to the print settings indicated in the accompanying print setting profile.

Figure 2:
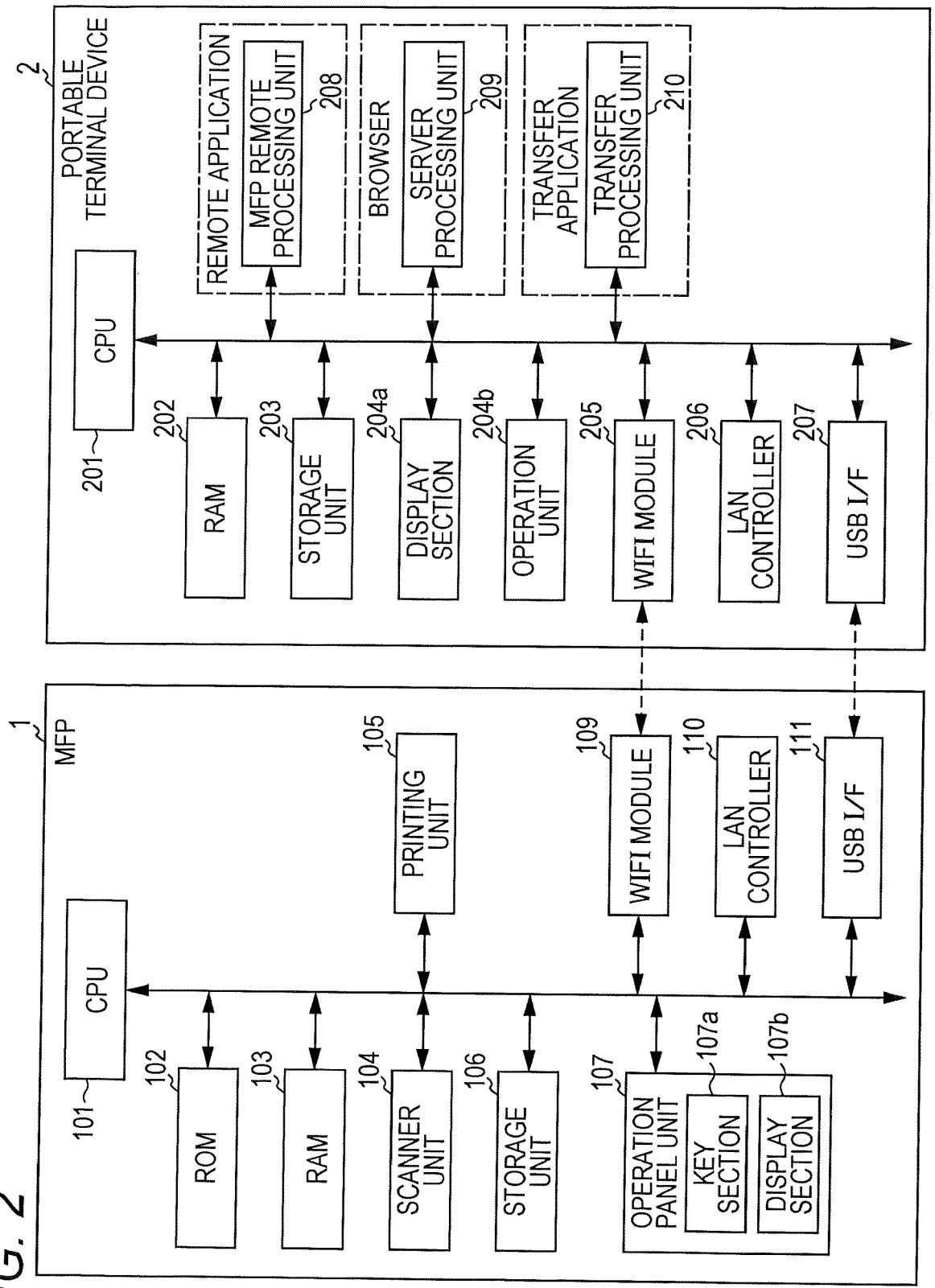
FIG. 2 is a block diagram illustrating an electrical configuration of a printing apparatus and a portable terminal device.

FIG. 2 is a block diagram illustrating an electrical configuration of the MFP 1 and the portable terminal 2.

The MFP 1 includes a CPU 101, a ROM 102, a RAM 103, a scanner unit 104, a printing unit 105, a storage unit 106, an operation panel unit 107, a wireless fidelity (WIFI) module 109, a local area network (LAN) controller 110, a USB interface (USB I/F) 111, and the like.

The CPU 101 operates according to an operation program stored in the ROM 102 or the like to generally control the whole MFP 1. For example, the CPU 101 controls various functions of the MFP 1 to be used, and further in the present embodiment, the CPU 101 transmits, to the portable terminal 2, a screen data for configuration of an operation screen of the MFP 1 itself and display of the operation screen as a remote screen on the portable terminal 2, based on a request from the portable terminal 2, creates the print setting profile about the print settings of the MFP 1 itself set through the portable terminal 2, based on a request from the portable terminal 2, and transmits the created print setting profile and the IP address or the like of itself to the portable terminal 2. Further, the CPU 101 performs printing when a print job is transmitted from the server 3.

The ROM 102 is a memory for storing an operation program or the like of the CPU 101, and the RAM 103 is a memory for providing a work area when the CPU 101 operates according to the operation program.

The scanner unit 104 reads a document set on a platen glass, not illustrated, or an image of a document set on an automatic document feeder, also not illustrated, and outputs image data as electronic data.

The printing unit 105 prints image data of a document read by the scanner unit 104, or data to be printed transmitted from the portable terminal 2 or the like, on a sheet.

The storage unit 106 stores various data, applications, or the like, and a hard disk device or the like is used as the storage unit 106. Particularly, in the present embodiment, the storage unit 106 stores various display data sets (screen data) for the operation screen, displayed on the operation panel unit 107, the CPU 101 calls the screen data for the operation screen from the storage unit 106, according to user's operation, and the screen data is displayed on the operation panel unit 107, or transmitted to the portable terminal 2. Further, the storage unit 106 stores a document file including image data read by the scanner unit 104, or a plurality of files such as document files transmitted from an external apparatus.

The operation panel unit 107 includes a key section 107a for operating the MFP 1 or displaying a message or the like for the user, and having mechanical hardware keys, such as a start key, a stop key, a reset key, a numeric keys, and a display section 107b including a touch panel of liquid crystal or the like allowing touch input operation. The touch operation is normally performed by gesture control defining an operation content according to the number of fingers touched or the movement of a finger. The gesture control includes a single touch operation performed by being touched with a finger, and a multi-touch operation performed by being touched with a plurality of fingers. An example of the single touch operation includes a flick operation for drawing out or scrolling a screen (turning a page or turning back a page), or a slide operation for sliding a screen. An example of the multi-touch operation includes a pinch-in operation, a pinch-out operation, or the like for instruction of changing a magnification (enlargement or reduction), rotation, or the like of an image.

The WIFI module 109 is an interface for wireless connection with the portable terminal 2, and the LAN controller 110 controls communication with an external apparatus, such as a personal computer or another MFP.

The USB interface 111 is an interface for wired connection with the portable terminal 2.

While, as the portable terminal 2, a smartphone, a tablet terminal, an electronic paper or the like is used. The portable terminal 2 includes a CPU 201, a RAM 202, a storage unit 203, a display section 204a, an operation unit 204b, a WIFI module 205, a LAN controller 206, a USB interface 207, an MFP remote processing unit 208, a server processing unit 209, a transfer processing unit 210, and the like.

The CPU 201 generally controls the whole portable terminal 2, and operates according to an operating system (OS) as basic software, below-mentioned various applications, or a generic application.

The RAM 202 is a memory serving as a work area when the CPU 201 operates according to an operation program.

The storage unit 203 stores various data, applications, or the like, and a hard disk device or the like is used as the storage unit 203. In the present embodiment, the storage unit 203 stores remote screen display data transmitted from the MFP 1, and programs such as a basic OS, applications, and the like. It is noted that, in the following description, the application is also simply referred to as application.

The display section 204a includes a device of liquid crystal or the like, and the operation unit 204b is provided on the display section 204a, and includes a touch panel allowing touch input operation. As in the case of the MFP 1, touch operation is normally performed by gesture control defining an operation content according to the number of fingers touched or the movement of a finger. The gesture control includes a single touch operation or a multi-touch operation, an example of the single touch operation includes a flick operation or a slide operation, and an example of the multi-touch operation includes a pinch-in operation, a pinch-out operation, or the like.

The WIFI module 205 is an interface for wireless connection between the portable terminal 2 and the MFP 1, and the LAN controller 206 controls communication with an external apparatus such as a user's terminal. Further, the USB interface 207 is an interface for wired connection between the portable terminal device 2 and the MET 1.

The MFP remote processing unit 208 makes the print function or the like of the MFP 1 available from the portable terminal device 2. Specifically, the screen data for reproduction of the same operation screen as the operation screen, such as a print setting screen, displayed on the operation panel unit 107 of the MFP 1 is received from the MFP 1, for use of the print function or the like of the MFP1, and the screen data is displayed as the remote screen on the display section 204a, and user's pressing of an operation button or the like displayed on the remote screen is detected as coordinates of an operation position on the screen, and transmitted as operation information to the MFP 1. The MFP 1 analyzes the coordinates of the operation position to specify user's operation instruction, and performs operation according to the operation instruction. The MFP remote processing unit 208 has functions achieved by performing remote application by the CPU 201.

The server processing unit 209 is configured to log in to the server 3 to make the user select a desired data set from a plurality of data sets to be printed stored in the server 3, and report information about the selection to the server 3. This function is achieved by the operation of the CPU 201 according to a web browser.

When the user sets print setting on the print setting screen displayed, by the MFP remote processing unit 208, on the display section 204a, and information representing the setting of the print settings is transmitted to the MFP 1, the transfer processing unit 210 makes a request to the MFP 1 for creation of the print setting profile about the print settings, and makes a request for transfer of the created print setting profile and the IP address of the MFP 1 to the portable terminal 2. Processing of, for example, addition of attribute information to the transferred print setting profile and IP address, and transfer of the print setting profile and IP address to the server 3 is performed, but detailed description will be made below. The transfer processing unit 210 has a function achieved by the operation of the CPU 201 according to a transfer application.

Figure 3:
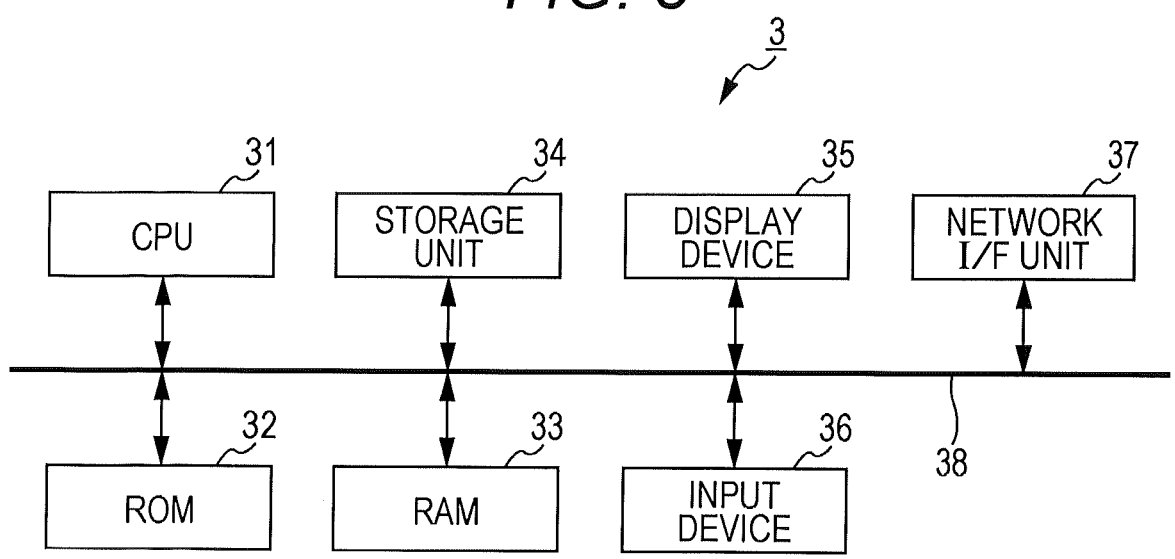
FIG. 3 is a block diagram illustrating a configuration of a cloud server.

FIG. 3 is a block diagram illustrating a configuration of the cloud server 3. The server 3 is a personal computer, and stores a print profile and the like transferred from the portable terminal 2, and transmits the data set to be printed selected by the user, the print profile, and the like from the portable terminal 2 to the MFP 1.

As illustrated in FIG. 3, the server 3 includes a CPU 31, a ROM 32, a RAM 33, a storage unit 34, a display device 35, an input device 36, a network interface unit (network I/F unit) 37, and the like which are connected to each other through a system bus 38.

The CPU 31 executes a program stored in the ROM 32 to generally control the whole server 3. The ROM 32 is a storage medium for storing a program executed by the CPU 31 and the other data. The RAM 33 is a storage medium for providing a work area when the CPU 31 operates according to an operation program.

The storage unit 34 includes a storage medium such as a hard disk, stores a plurality of data sets to be printed, and further stores the print setting profile and the other data transmitted from the portable terminal 2.

The display device 35 includes a CRT display device, a liquid crystal display device, or the like, and displays various messages, an input reception screen or a selection screen for the user, or the like.

The input device 36 is used for user's input operation, and includes a keyboard, a mouse, or the like.

The network interface unit 37 functions as a communication unit for transmission and reception of data between the portable terminal 2 or the printing apparatus 1 and another external device through a network.

Next, an overall operation of the printing system illustrated in FIG. 1 will be described with reference to a flowchart of FIG. 4. It is noted that operation of each apparatus is performed by operation of the CPU of each apparatus according to the operation program or the applications.

Based on user's operation on the portable terminal 2, the browser is started to log in to the cloud server 3, the remote application is started to display the operation screen of the MFP 1 (hereinafter, also referred to as remote panel) (step S11).

Figure 5:
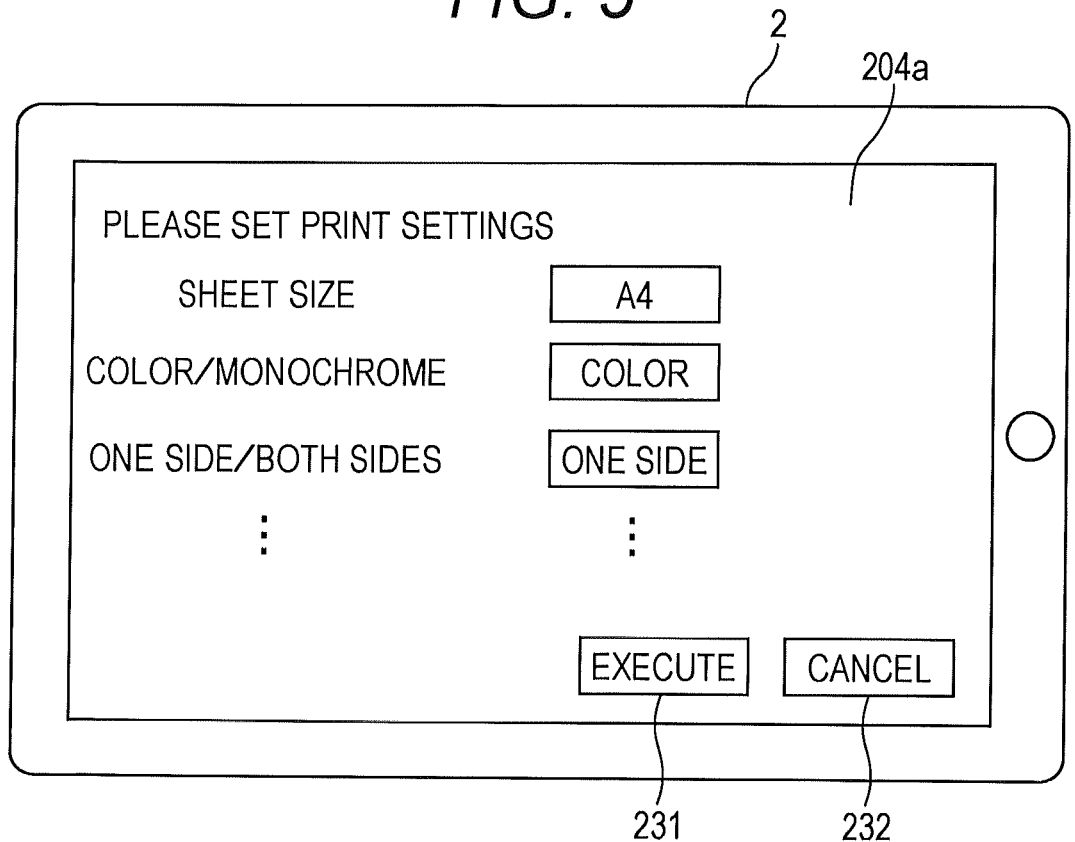
FIG. 5 is a diagram illustrating a print setting screen.

Next, when the user starts the transfer application, the print setting screen for urging setting of the print settings is displayed on the display section 204a based on the remote application, as illustrated in FIG. 5 (step S12). The print setting screen displays thereon setting items of a sheet size, color printing or monochrome printing, one-side printing or both-side printing, and the like, and the user sets desired print settings. Further, when an execute button 231 is pressed, the set contents are transmitted to the MFP 1, and when a cancel button 232 is pressed, the settings are canceled.

When the user sets the print settings on the remote panel, and presses the execute button 231, the settings are received, and information of the setting is transmitted to the MFP 1 (step S13). Further, when the execute button 231 is pressed, the transfer application makes a request, to the MFP 1, for creation of the print setting profile and transfer of the created print setting profile to the portable terminal 2 (step S14). At the same time, the transfer application also makes a request for transfer of the IP address of the MFP 1.

When receiving data about the print settings from the portable terminal 2, the MFP 1 analyzes the data to specify the print settings, creates the print setting profile, based on the request from the portable terminal 2, and transfers the created print setting profile to the portable terminal 2 (step S1). At that time, the MFP 1 transfers the IP address of itself and an encryption key which are added to the print setting profile, to the portable terminal 2. The encryption key is not particularly limited, but can include for example a serial number with date.

When receiving the print setting profile, to which the IP address and the encryption key are added, from the MFP 1 (step S15), the portable terminal 2 transfers the print setting profile to the server 3 (step S16). At that time, the portable terminal 2 also transfers information indicating the MFP 1 and the attribute information for specifying the transferred print setting profile together with the print setting profile. The attribute information is not limited, as long as the attribute information can identify and specify the print setting profile, and includes for example a serial number.

Figure 6:
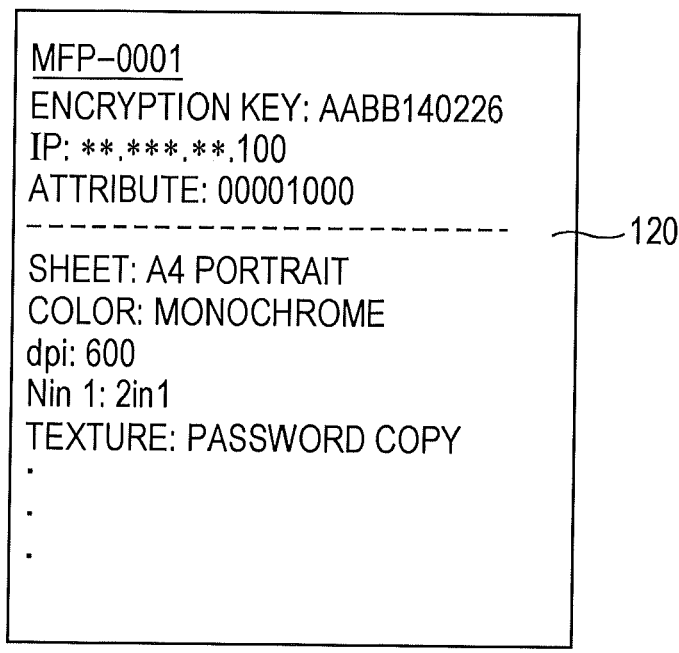
FIG. 6 is a diagram illustrating an exemplary print setting profile transferred to a web server.

FIG. 6 illustrates an exemplary print setting profile transferred to a cloud server 3. In this print setting profile, an ID indicating the MFP 1 "MFP-001", an encryption key, an IP address, and attribute information are added to print settings.

Figure 7:
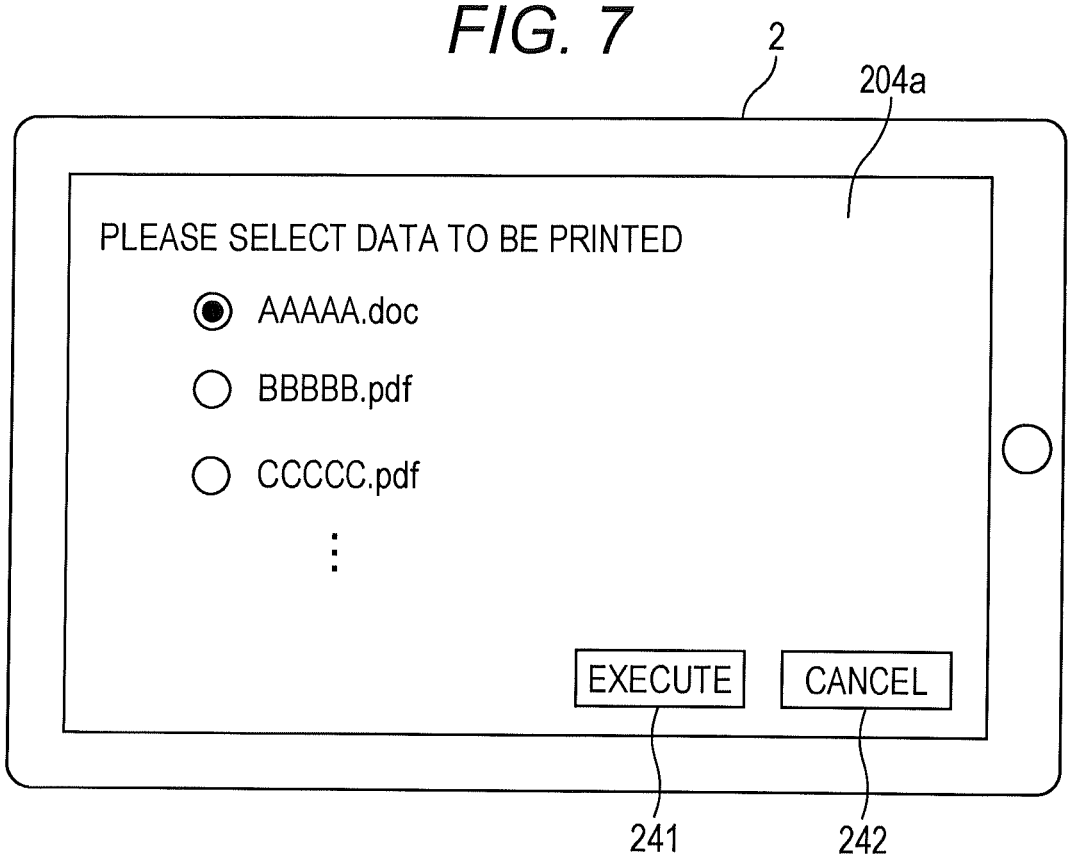
FIG. 7 is a diagram illustrating a selection screen for data sets to be printed.

Next, the user accesses a folder storing the data sets to be printed of the server 3 to which the user logging in, selects a data set desired to be printed on the selection screen illustrated in FIG. 7, and presses the execute button 241. Thereupon, the selection information for specifying the selected data set to be printed, a print instruction, and attribute information the same as the attribute information added to the transferred print setting profile, are transmitted from the portable terminal 2 to the server 3 (step S17).

First, the cloud server 3 receives the print setting profile from the portable terminal 2 (step S21), and the received print setting profile is stored in a preset print storage area of the storage unit 34. Further, the cloud server 3 receives the selection information, the print instruction, and the attribute information from the portable terminal 2 (step S22), specifies the data set to be printed based on the selection information, and associates the data set to be printed with the print setting profile. The association is performed based on comparison between the attribute information added to the print setting profile, and the attribute information transmitted with the selection information and the like.

Next, the cloud server 3 logs in using the IP address of the MET 1 added to the print setting profile associated with the selected data set to be printed (step S23).

When the MFP 1 returns a response of login permission to the server 3 (step S2), the server 3 transmits, to the MFP 1, the selected data set to be printed and the print job including the print setting profile associated with the selected data set to be printed (step S24).

After receiving the print job from the server 3, the MFP 1 determines whether the received print setting profile is the print setting profile created by the MFP 1 itself by comparing the encryption key added to the print setting profile by the MFP 1 itself upon transfer of the print setting profile to the portable terminal 2, with the encryption key added to the print setting profile transmitted from the server 3 (step S3).

Then, when the received print setting profile is the print setting profile created by the MFP 1 itself, the MFP 1 reflects the print settings described in the print setting profile to print settings of the MFP 1 itself (step S4), and then performs printing (step S5). It is noted that, when the received print setting profile is not a print setting profile created by the MFP 1 itself, the MFP 1 returns a response of the difference to the server 3. In this case, printing is not performed.

As described above, in the present embodiment, based on the user's operation on the portable terminal 2, the print settings set on the print setting screen being the remote screen of the MFP 1 is created as the print setting profile in the MFP 1, according to the request from the portable terminal 2, and the print setting profile is transferred to the portable terminal 2 together with the address information of the MFP 1, and further transferred to the server 3. Whereas, the portable terminal 2 selects the data set to be printed from one or more data sets to be printed stored in the server 3, based on user's operation, and makes a print instruction, to the server 3, for printing the selected data set to be printed using the print settings according to the print setting profile. The server 3 transmits the print job including the data set to be printed and the print setting profile transferred from the portable terminal 2, to the MFP 1 indicated by the address information transferred from the portable terminal 2, and the MET 1 receives the print job transmitted from the server 3, and prints the data set to be printed included in the received print job, using the print settings indicated in the print setting profile included in the print job.

Accordingly, the MFP 1 is only required to perform printing when receiving the print job including the print setting profile from the server 3, and since only data set to be printed is obtained from the server 3 separately from the print settings, an disadvantage is eliminated that print settings cannot be set for a next job.

Further, the print setting screen of the MFP 1 is used to set the print settings, and the MFP 1 creates the print setting profile, so that the print settings specific to the MFP 1 can be used. Furthermore, it is not necessary to report the authentication information stored in the portable terminal 2 to the printing apparatus, and security issue is solved.

Figure 8:
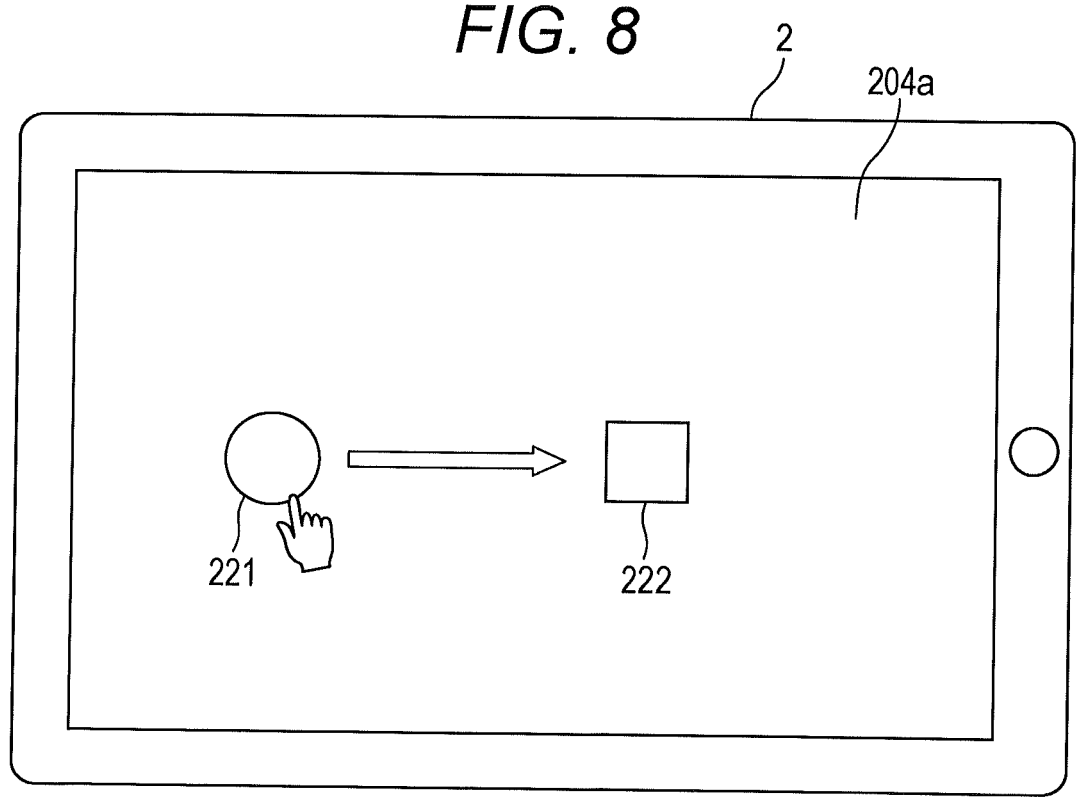
FIG. 8 is diagram illustrating a starting operation of a transfer application.

In the present embodiment, as illustrated in FIG. 8, the transfer application for making requests to the MFP 1 for creation and transfer of the print setting profile is started, when a remote application icon 221 displayed on the display section 204a of the portable terminal 2 is touched and moved (dragged) to be superposed on a browser icon 222, and predetermined starting operation is performed, The predetermined operation includes drop operation, pinch-in operation, or the like of the icon 221. Such an operation readily starts the transfer application.

Figure 9:
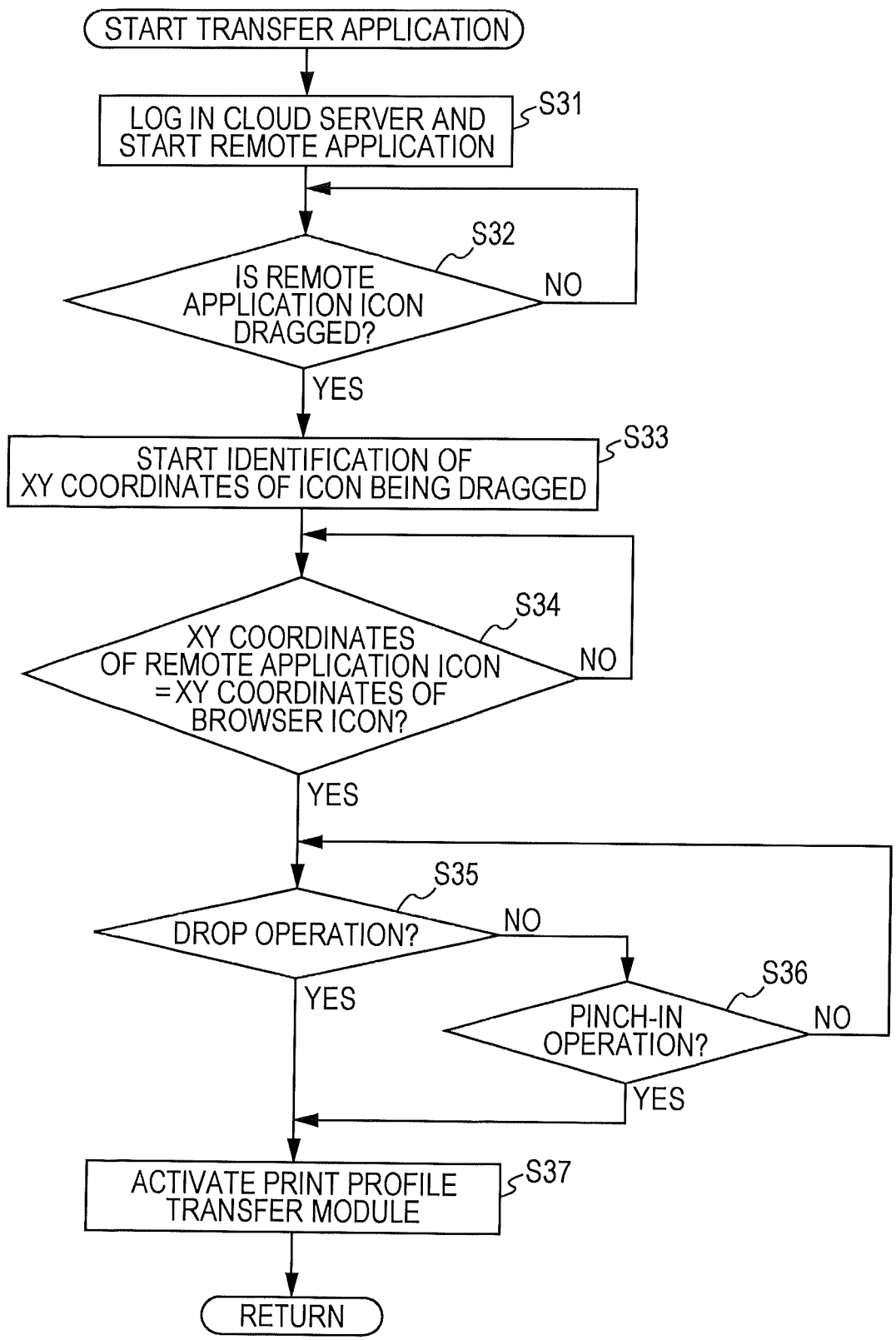
FIG. 9 is a flowchart illustrating starting of a transfer application by the operation illustrated in FIG. 8.

FIG. 9 is a flowchart illustrating starting of the transfer application by an operation as described above.

In step S31, the browser is started based on user's operation for login to the cloud server 3, and the remote application is started.

In step S32, when the remote application icon 221 on standby (step S32: NO) is dragged (step S32: YES), identification of XY coordinates of the icon 221 being dragged is started, in step S33.

Next, in step S34, it is determined whether the XY coordinates of the remote application icon 221 are equal to XY coordinates of the browser icon 222, or whether the remote application icon 221 is superposed on the browser icon 222.

When the icons are not superposed on each other (step S34: NO), the icon 221 is held in standby condition. When the icons are superposed on each other (step S34: YES), it is determined whether the drop operation is performed, in step S35. When the drop operation is not performed (step S35: NO), it is determined whether the pinch-in operation is performed in step S36. When the pinch-in operation is not performed (step S36: NO), the process returns to step S35.

When the drop operation is performed (step S35: YES), or when the pinch-in operation is performed (step S36: YES), a print profile transfer module is activated in step S37. This module is a core of the transfer application, makes requests to the MFP 1 for the creation and the transfer of the print profile, or transfers the print profile to the server 3, in the background.

Figure 10:
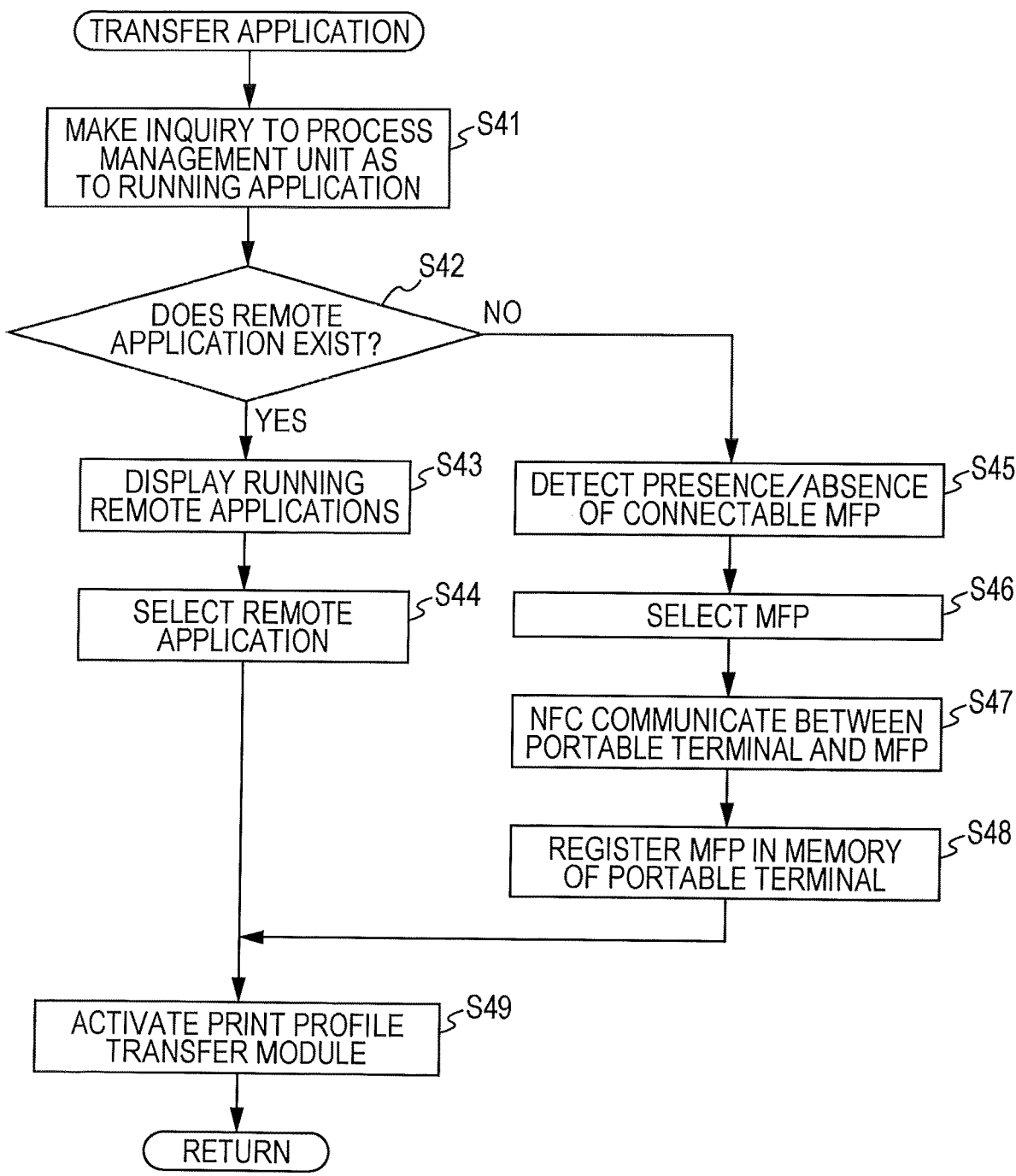
FIG. 10 is a flowchart illustrating processing of detection or the like of a printing apparatus by a transfer application.

In the present embodiment, the transfer application also functions to detect an MFP 1 to which the remote application itself can be connected, or register a new remote application, web browser, or the like, when the remote application or the like is not started, FIG. 10 is a flowchart illustrating processing of detection or the like of an MFP 1 by a transfer application.

When the user starts the transfer application, an inquiry is made to a process management unit for managing a running application, as to a running application, in step S41, and it is determined whether one or more remote applications exist in running applications, in step S42. When the one or more remote applications exist therein (step S42: YES), the one or more running remote applications are displayed in step S43. When a remote application is selected based on user's selection operation in step S44, the print profile transfer module is activated in step S49.

Figure 11:
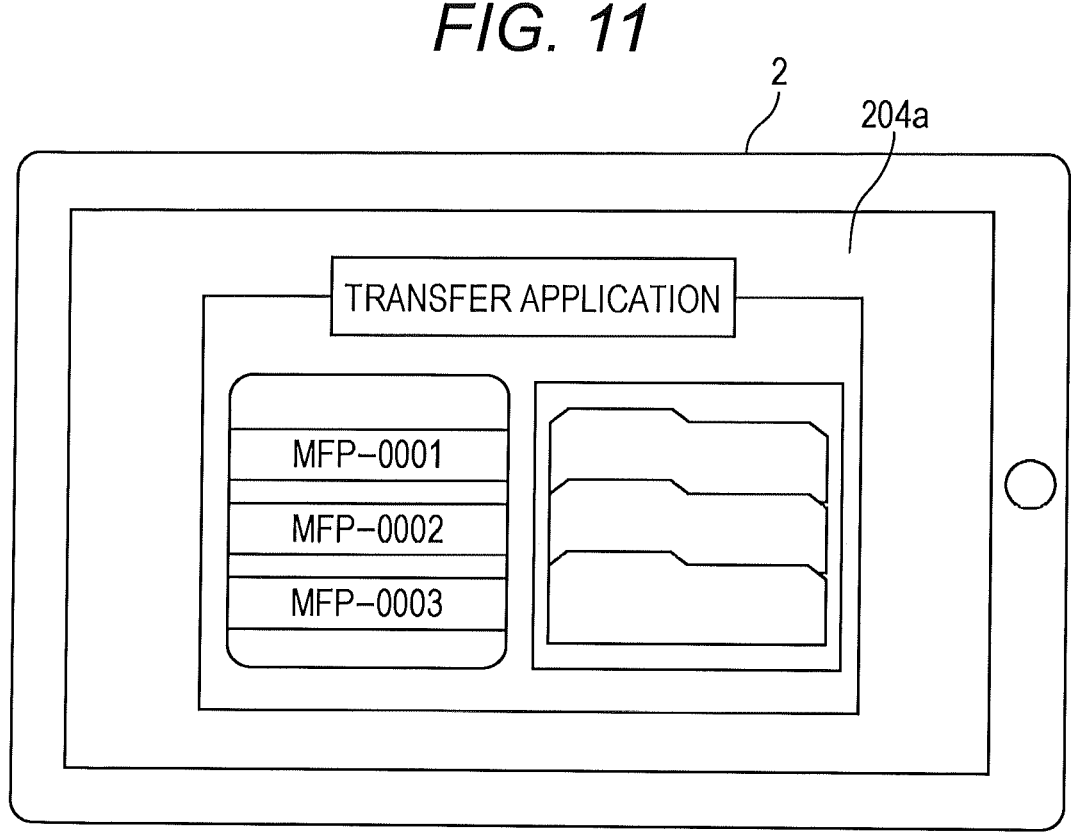
FIG. 11 is a diagram illustrating a display screen showing a detection result of the processing of FIG. 10.

When the remote application does not exists in the running applications in step S42 (step S42: NO), the presence or absence of a connectable MFP 1 is detected in step S45. FIG. 11 is a diagram illustrating a display screen showing a detection result. In the present embodiment, the display screen shows detected three MFPs.

In step S46, after any one is selected from the connectable MFPs, based on user's selection operation, and in step S47, near field communication (NFC) is performed between the portable terminal 2 and the selected MFP 1 to obtain information from the MFP 1.

Next, in step S48, the information about the MFP 1 is registered in the storage unit 203 of the portable terminal 2. FIG. 12 is a table illustrating exemplary information about the MFP 1 to be registered. In this example, an ID of an MFP 1, an IP address, an encryption key, a communication method, and the like are registered. In step S49, the print profile transfer module is activated.

After activation of the print profile transfer module, a request for transfer of the print setting profile is transmitted to the MFP selected by the user in step S46. The MFP 1 creates the print setting profile, adds the IP address of the MFP 1 itself and an encryption key to the print setting profile, and transfers the print setting profile to the portable terminal 2. In this configuration, the print setting profile created at the MFP 1 may be a profile of default print settings of the MET 1, or a profile of print settings preliminarily set in the MFP 1 by the user.

The print setting profile transferred to the portable terminal 2 is transferred to the cloud server 3 together with the attribute information, and is stored in the cloud server 3.

Whereas, when the user starts the web browser in the portable terminal 2, and the user selects a data set to be printed, the selection information and the attribute information are transmitted to the cloud server 3.

The cloud server 3 associates the selected data set to be printed with the print setting profile based on the attribute information, and transmits the associated data set to be printed and print setting profile to the MFP 1. The MFP receiving the data set to be printed and the print setting profile prints the data set to be printed, using the print settings indicated in the print setting profile.

Figure 13:
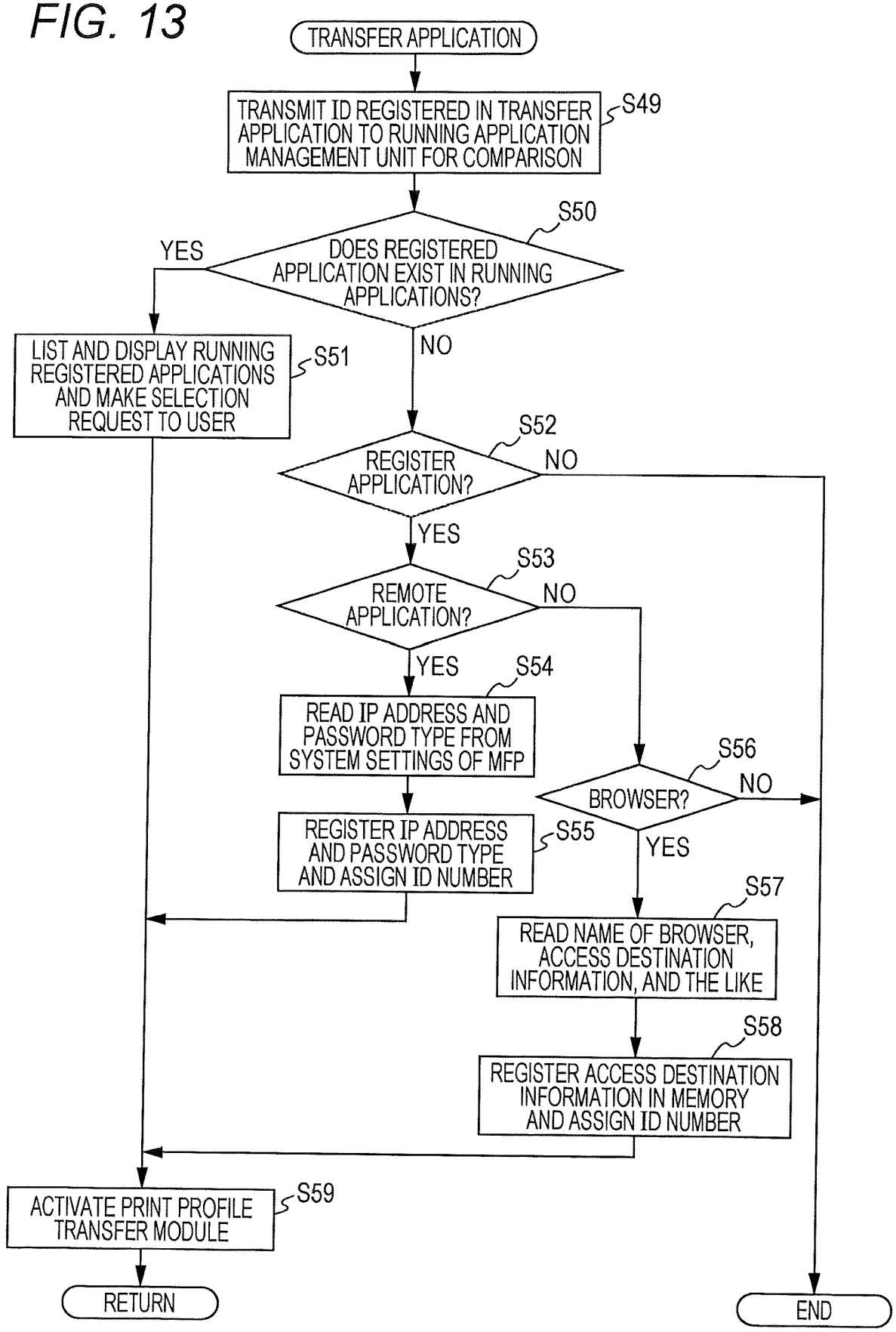
FIG. 13 is a flowchart illustrating processing of registration of a browser for access to a remote application and/or a server, performed based on a transfer application.

FIG. 13 is a flowchart illustrating processing of registration of a browser for access to the remote application and/or the server 3, performed based on the transfer application.

When the user starts the transfer application, an application ID registered in the transfer application is transmitted to a running application management unit for comparison, in step S49, and it is determined whether the remote application or the browser having been registered in the transfer application exists in the running applications, in step S50. When the remote application or the browser is in the running applications (step S50: YES), the running remote applications or the browsers being registered are listed and displayed so that the user select any of the remote applications and the browsers, in step S51, and the print profile transfer module is activated in step S59.

When the remote application or the browser is not in the running applications in step S42 (step S50: NO), the running application does not access an access destination registered in the transfer application, so that an inquiry is made to the user as to whether to register the application (including an access destination thereof) in step S52. When the application is not registered (step S52: NO), the processing is finished. When the application is registered (step S52: YES), it is determined whether the application is a remote application, in step S53. When the application is the remote application (step S53: YES), after an IP address and a password type are read from system settings of the MFP 1, in step S54, and the IP address and the password type are registered in a transfer application memory, and an ID number is assigned to the application, in step S55. The print profile transfer module is activated in step S59.

When the application is not the remote application, in step S53 (step S53: NO), it is determined whether the application is a web browser in step S56, and when the application is not a web browser (step S56: NO), the processing is finished. When the application is a web browser (step S56: YES), a name of the web browser and an access destination such as an URL which the web browser accesses are read in step S57, and then, the access destination and the like are registered in the storage unit 203, and an ID number is assigned to the web browser in step S58. The print profile transfer module is activated in step S59.

FIG. 14 is a table illustrating an example of information registered in the storage unit 203. In this example, an ID of a browser, a browser type, an URL, a storage position of a print setting profile, and the like are registered.

Figure 4:
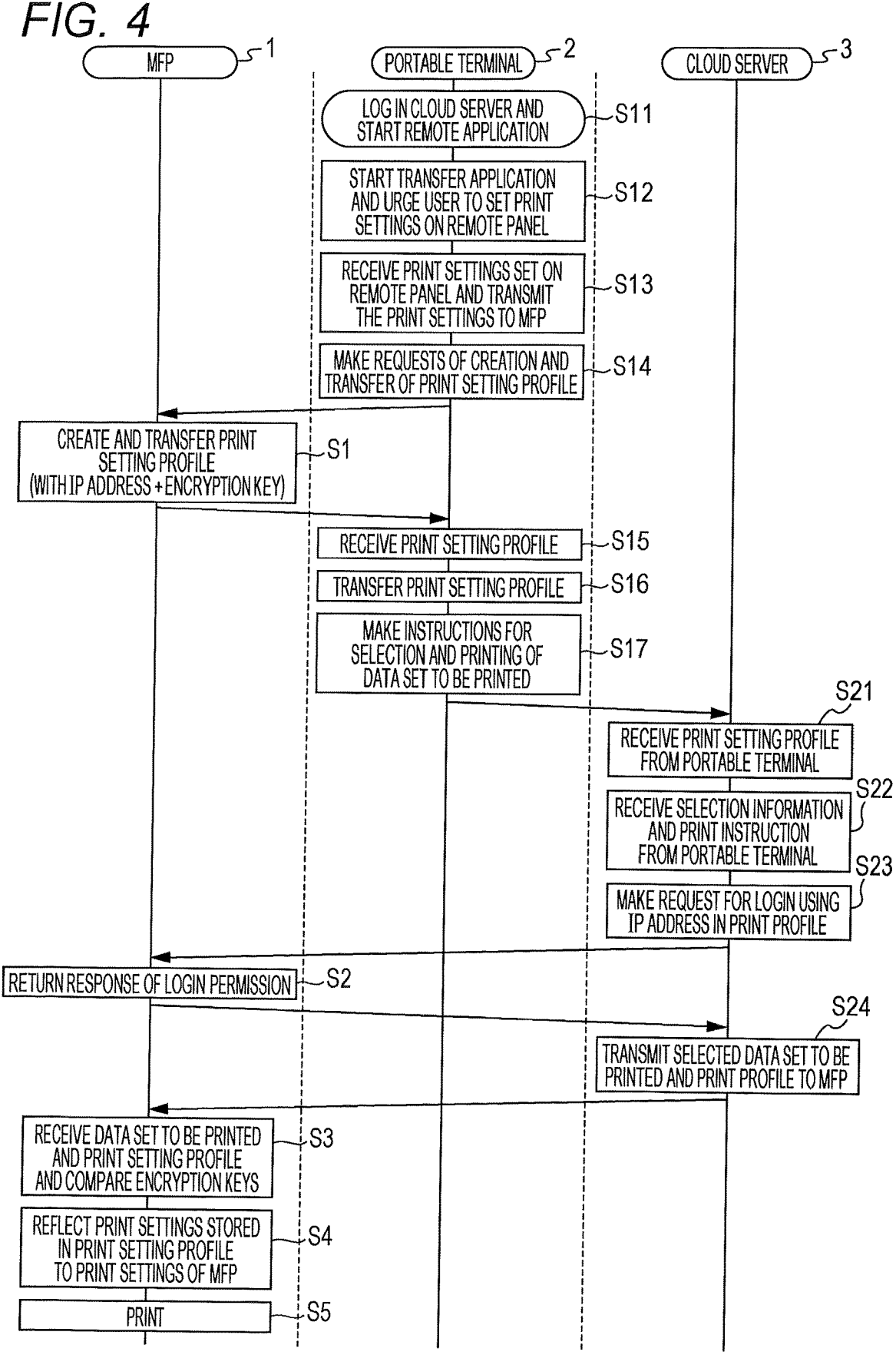
FIG. 4 is a flowchart illustrating an overall operation of the printing system illustrated in FIG. 1.

After the print profile transfer module is started, the same operation as described in an aspect of FIG. 4 is performed. That is, the print setting screen of the MFP 1 is displayed on the display section 204a, when the user sets the print settings and presses the execute button 231, the print setting profile is created at the MFP 1, the IP address of the MFP 1 itself and the encryption key are added to the print setting profile and the print setting profile is transferred to the portable terminal 2, and further the print setting profile is transferred to the cloud server 3 together with the attribute information, and stored in the cloud server 3.

When the user selects a data set to be printed on the portable terminal 2, the selection information and the attribute information are transmitted to the cloud server 3.

The cloud server 3 associates the selected data set to be printed with the print setting profile based on the attribute information, and transmits the associated data set to be printed and print setting profile to the MFP 1. The MFP receiving the data set to be printed and the print setting profile prints the data set to be printed, using the print settings indicated in the print setting profile.

An embodiment of the present invention has been described above, but the present invention is not intended to be limited to the above embodiment. For example, the configuration has been described in which the user selects the data set to be printed on the portable terminal 2 and the print instruction is transmitted to the server 3, but a configuration may be provided in which until the MFP 1 has a printable state, the print instruction is not performed from the portable terminal 2.

That is, when the MFP 1 has a printable state of itself, the MFP 1 reports the printable state to the portable terminal 2. The portable terminal 2 displays the icon indicating the printable state reported from the MFP 1, on the display section 204a, and when the user operates the icon, the portable terminal 2 instructs the server 3 to transfer the print job to the MFP 1, or to perform printing. Therefore, printing by the MFP 1 can be efficiently performed.

Further, the configuration has been described in which the print setting screen of the MFP 1 is displayed as the remote screen on the portable terminal 2, using the remote application, and the print settings are set on the print setting screen, but a configuration may be provided in which the portable terminal 2 accesses the MFP 1 using the web browser, and calls the print setting screen for print setting.

According to an embodiment of the present invention, in Item. 1, the printing apparatus creates the print setting profile, the created print setting profile is transferred to the portable terminal device together with the address information of the printing apparatus, according to the request from the portable terminal device, and the created print setting profile is further transferred to the server.

Whereas, the portable terminal device selects the data set to be printed from the one or more data sets to be printed saved in the server, based on user's operation, and makes the print instruction, to the server, for printing the selected data set to be printed using the print settings according to the print setting profile.

The server transmits the print job including the data set to be printed and the print setting profile transferred from the portable terminal device, to the printing apparatus indicated by the address information transferred from the portable terminal device, and the printing apparatus receives the print job transmitted from the server, and prints the data set to be printed included in the received print job, using the print settings indicated in the print setting profile included in the print job.

Accordingly, the printing apparatus is only required to perform printing when receiving the print job including the print setting profile from the server, and since only data set to be printed is obtained from the server separately from the print settings, an disadvantage is eliminated that print settings cannot be set for the next job.

Further, the printing apparatus creates the print setting profile, so that the print settings specific to the printing apparatus can be used.

Furthermore, it is not necessary to report the authentication information stored in the portable terminal device to the printing apparatus, and security issue is solved.

According to an embodiment of the present invention, in Item. 2, the print settings set from the print setting screen of the printing apparatus based on user's operation on the portable terminal device is transmitted to the printing apparatus, and the print setting profile is created.

According to an embodiment of the present invention, in Item. 3, the icon representing a first application is superposed on the icon representing a second application by the user, which are displayed on the display unit of a portable terminal device, to perform a predetermined operation of starting the third application, and the third application is started. Therefore, a third application can be started by a simple operation to transfer the print setting profile and the address information.

According to an embodiment of the present invention, in Item. 4, the third application determines whether the first application has been started, when the first application has not been started, the third application detects connectable printing apparatuses, and the third application can make a transfer request for a print setting profile, to a printing apparatus selected by the user from the detected printing apparatuses.

According to an embodiment of the present invention, in Item. 5, the third application functions to determine whether the portable terminal device itself accesses an access destination preliminarily registered, based on the first application and/or the second application, and register another access destination other than the access destination preliminarily registered, based on user's operation, when the portable terminal device itself accesses the another access destination other than the access destination preliminarily registered, and a new access destination can be registered by a simple operation.

According to an embodiment of the present invention, in Item. 6, the printing apparatus can readily confirm that the print setting profile transmitted from the server is the print setting profile issued by the printing apparatus itself, based on an encryption key added to the print setting profile transmitted from the server.

According to an embodiment of the present invention, in Item. 7, the server can readily associate the print setting profile with the selected data set to be printed using the attribute information.

According to an embodiment of the present invention, in Item. 8, the printing apparatus can receive the print job from the server during the printable state, and thus printing can be efficiently performed.

According to an embodiment of the present invention, in Item. 9, since only the data set to be printed is obtained from the server separately from the print settings, the disadvantage is eliminated that the print settings cannot be set for the next job, and the portable terminal device can cause the printing apparatus to perform printing without the security issue.

According to an embodiment of the present invention, in Item. 10, the print setting profile about the print settings set from the print setting screen of the printing apparatus can be created in the printing apparatus, and the print setting profile can be transferred, based on user's operation.

According to an embodiment of the present invention, in Item. 11, the third application can be started by the simple operation to transfer the print setting profile and the address information.

According to an embodiment of the present invention, in Item. 12, the third application determines whether the first application has been started, when the first application has not been started, the third application detects connectable printing apparatuses, and the third application can make a transfer request for a print setting profile, to a printing apparatus selected by the user from the detected printing apparatuses.

According to an embodiment of the present invention, in Item. 13, a new access destination can be registered by a simple operation.

According to an embodiment of the present invention, in Item. 14, the server can readily associate the print setting profile with the selected data set to be printed using the attribute information.

According to an embodiment of the present invention, in Item. 15, the printing apparatus can receive the print job from the server during the printable state, and thus printing can be efficiently performed.

According to an embodiment of the present invention, in Item. 16, since only the data set to be printed is obtained from the server separately from the print settings, the disadvantage is eliminated that the print settings cannot be set for the next job, and the print settings specific to the printing apparatus can be used, furthermore, the portable terminal device can be caused to perform processing for causing the printing apparatus to perform printing without the security issue.

Although the present invention has been described and illustrated in detail, it is clearly understood that the same is by way of illustrated and example only and is not to be taken by way of limitation, the scope of the present invention being interpreted by terms of the appended claims.

What is claimed is:
1. A printing system comprising:
a printer;
a portable terminal device; and
a server, which are connectable to each other,
the printer including:
a first hardware processor configured to:
    receive print settings about a job from the portable terminal device,
    create a print setting profile based on the received print settings, said print setting profile configured to cause a print job, generated from a data set and the print setting profile, and used by the printer to print the data set, to have at least one characteristic according to the received print settings,
    combine the print setting profile with address information of the printer itself and an encryption key, and
    transmit the combined print setting profile, address information and encryption key to the portable terminal device, according to a request from the portable terminal device,
the portable terminal device including:
a display; and
a second hardware processor configured to:
    set the print settings about the job to be printed by the printer and transmit the print settings about the job to the printer,
    make a request, to the printer, for transfer of the created print setting profile, the address information of the printer and the encryption key to the portable terminal device itself,
    transfer, to the server, the print setting profile, the address information and the encryption key created at and transferred from the printer, based on the request, and
    select a data set to be printed from one or more data sets to be printed stored in the server based on user's operation, and make a print instruction, to the server, for printing the selected data set to be printed using the print settings according to the print setting profile,
the server including:
a storage configured to store the one or more data sets to be printed; and
a third hardware processor configured to:
    receive the print setting profile, the address information and the encryption key transferred from the portable terminal device, and generate a print job including the selected data set to be printed and the received print setting profile, by associating the selected data set to be printed with the received print setting profile based on the print instruction from the portable terminal device, and transmit the generated print job to the printer indicated by the address information, the first hardware processor of the printer further configured to:

receive the print job transmitted from the server, and print the data set to be printed included in the received print job using the print settings indicated in the print setting profile included in the print job, and wherein the server logs in using the address information added to the received print setting profile associated with the selected data set to be printed and transmits the selected data set to be printed to the printer, and then the printer confirms that the print setting profile is the print setting profile created by itself based on the encryption key added to the print setting profile transmitted from the server.

2. The printing system according to claim 1, wherein the second hardware processor of the portable terminal device is further configured to set the print settings from a print setting screen on the printer, based on user's operation on the display, and to make a request, to the printer, for creating the print setting profile of the print settings that are set.

3. The printing system according to claim 2, wherein the portable terminal device includes a first application configured to achieve a function of setting the print settings, a second application configured to achieve a function of selecting the data set to be printed and making the print instruction, and a third application configured to achieve functions of requesting transfer of the created print setting profile and the address information and the encryption key, and of transferring the print setting profile and the address information and the encryption key, and an icon representing the first application displayed on the display is superposed on an icon representing the second application by the user to perform predetermined operation of starting the third application, and the third application is started.

4. The printing system according to claim 2, wherein the portable terminal device includes a first application configured to achieve a function of setting the print settings, a second application configured to achieve a function of selecting the data set to be printed and making the print instruction, and a third application configured to achieve functions of requesting transfer of the created print setting profile and the address information and the encryption key, and of transferring the print setting profile and the address information and the encryption key, and the third application functions to determine whether the first application has been started, detect connectable printers when the first application has not been started, and make a request for transfer of the print setting profile to a printer selected from the detected printers by the user.

5. The printing system according to claim 2, wherein the portable terminal device includes a first application configured to achieve a function of setting the print settings, a second application configured to achieve a function of selecting the data set to be printed and making the print instruction, and a third application configured to achieve functions of requesting transfer of the created print setting profile and the address information and the encryption key, and of transferring the print setting profile and the address information and the encryption key, and the third application functions to determine whether the portable terminal device itself accesses an access destination preliminarily registered based on the first application and/or the second application, and register the access destination based on user's operation, when the portable terminal device accesses another access destination other than the access destination preliminarily registered.

6. The printing system according to claim 1, wherein the second hardware processor of the of the portable terminal device adds attribute information to the print setting profile and transfers the print setting profile to the server, and adds attribute information the same as the above attribute information to selection information indicating a selected data set to be printed, and transmits the selection information to the server.

7. The printing system according to claim 1, wherein the first hardware processor of the printer is configured to report a printable state of the printer to the portable terminal device, when the printable state is reported from the printer, the portable terminal device displays an icon indicating the printable state of the printer on the display, and when the user operates the icon, the portable terminal device instructs the server to transfer the print job to the printer.

8. A portable terminal device connectable to a printer and a server, comprising:

a display; and a hardware processor configured to:

set the print settings about a job to be printed by the printer and transmit the print settings about the job to the printer, make a request, to the printer, for transfer of a print setting profile created at the printer and combined with address information of the printer and an encryption key to the portable terminal device itself, said print setting profile configured to cause a print job, generated from a data set and the print setting profile, and used by the printer to print the data set, to have at least one characteristic according to the transmitted print settings;

transfer, to the server, the print setting profile and the address information and the encryption key created at and transferred from the printer, based on the request;

select a data set to be printed from one or more data sets to be printed stored in the server, based on user's operation, and make a print instruction, to the server, for printing the selected data set to be printed using print settings according to the print setting profile, and wherein the print instruction includes information for associating the selected data set to be printed with the transferred print setting profile, and wherein the server logs in using the address information added to the received print setting profile associated with the selected data set to be printed and transmits the selected data set to be printed to the printer, and then the printer confirms that the print setting profile is the print setting profile created by itself based on the encryption key added to the print setting profile transmitted from the server.

9. The portable terminal device according to claim 8, wherein the hardware processor is further configured to set the print settings from a print setting screen on the printer, based on user's operation on the display, and to make a request, to the printer, for creating the print setting profile of the print settings that are set.

10. The portable terminal device according to claim 9, further including a first application configured to achieve a function of setting the print settings, a second application configured to achieve a function of selecting the data set to be printed and making the print instruction, and a third application configured to achieve functions of requesting transfer of the created print setting profile and the address information and the encryption key, and of transferring the print setting profile and the address information and the encryption key,
 wherein an icon representing the first application displayed on the display is superposed on an icon representing the second application by the user to perform predetermined operation of starting the third application, and the third application is started.

11. The portable terminal device according to claim 9, further including a first application configured to achieve a function of setting the print settings, a second application configured to achieve a function of selecting the data set to be printed and making the print instruction, and a third application configured to achieve functions of requesting transfer of the created print setting profile and the address information and the encryption key, and of transferring the print setting profile and the address information and the encryption key,
 wherein the third application functions to determine whether the first application has been started, detect connectable printers when the first application has not been started, and make a request for transfer of the print setting profile to a printer selected from the detected printers by the user.

12. The portable terminal device according to claim 9, further including a first application configured to achieve a function of setting the print settings, a second application configured to achieve a function of selecting the data set to be printed and making the print instruction, and a third application configured to achieve functions of requesting transfer of the created print setting profile and the address information and the encryption key, and of transferring the print setting profile and the address information and the encryption key,
 wherein the third application functions to determine whether the portable terminal device itself accesses an access destination preliminarily registered, based on the first application and/or the second application, and register the access destination based on user's operation, when the portable terminal device itself accesses the access destination preliminarily registered.

13. The portable terminal device according to claim 8, wherein the hardware processor adds attribute information to the print setting profile and transfers the print setting profile to the server, and adds attribute information the same as the above attribute information to selection information indicating a selected data set to be printed, and transmits the selection information to the server.

14. The portable terminal device according to claim 8, wherein the portable terminal device displays an icon indicating the printable state reported from the printer, on the display, and when the user operates the icon, the portable terminal device instructs the server to transfer the print job to the printer.

15. A non-transitory recording medium storing a computer readable print control program causing a computer of a portable terminal device connectable to a printer and a server, to perform:
 setting the print settings about a job to be printed by the printer and transmitting the print settings about the job to the printer;
 a transfer request step of making a request, to the printer, for transfer of a print setting profile created at the printer and combined with address information of the printer and an encryption key to the portable terminal device itself, said print setting profile configured to cause a print job, generated from a data set and the print setting profile, and used by the printer to print the data set, to have at least one characteristic according to the transmitted print settings;
 a transfer step of transferring, to the server, the print setting profile and the address information and the encryption key created at and transferred from the printer, based on the request from the transfer request step; and
 a print instruction step of selecting a data set to be printed from one or more data sets to be printed stored in the server, based on user's operation, and making a print instruction, to the server, for printing the selected data set to be printed using print settings according to the print setting profile, and
 wherein the print instruction includes information for associating the selected data set to be printed with the transferred print setting profile, and
 wherein the server logs in using the address information added to the received print setting profile associated with the selected data set to be printed and transmits the selected data set to be printed to the printer, and then the printer confirms that the print setting profile is the print setting profile created by itself based on the encryption key added to the print setting profile transmitted from the server.

* * * * *